United States Patent
Liang et al.

(10) Patent No.: US 12,088,162 B2
(45) Date of Patent: Sep. 10, 2024

(54) STATOR WINDING, STATOR AND MOTOR

(71) Applicant: Magelec Propulsion Ltd., Shanghai (CN)

(72) Inventors: Hongbo Liang, Shanghai (CN); Li Guo, Shanghai (CN)

(73) Assignee: Magelec Propulsion Ltd., Shanghai (CN)

( * ) Notice: Subject to any disclaimer, the term of this patent is extended or adjusted under 35 U.S.C. 154(b) by 441 days.

(21) Appl. No.: 17/427,580

(22) PCT Filed: Jan. 23, 2020

(86) PCT No.: PCT/CN2020/073949
§ 371 (c)(1),
(2) Date: Jul. 30, 2021

(87) PCT Pub. No.: WO2020/156477
PCT Pub. Date: Aug. 6, 2020

(65) Prior Publication Data
US 2022/0123617 A1    Apr. 21, 2022

(30) Foreign Application Priority Data

Feb. 1, 2019    (CN) .......................... 201920180831.X

(51) Int. Cl.
*H02K 3/28*    (2006.01)
*H02K 1/16*    (2006.01)
(Continued)

(52) U.S. Cl.
CPC ................. *H02K 3/28* (2013.01); *H02K 1/16* (2013.01); *H02K 3/12* (2013.01); *H02K 15/045* (2013.01); *H02K 2213/03* (2013.01)

(58) Field of Classification Search
CPC .. H02K 3/28; H02K 3/12; H02K 1/16; H02K 15/045; H02K 2213/03
(Continued)

(56) References Cited

U.S. PATENT DOCUMENTS

2012/0186081 A1*    7/2012    Kamatani .......... H02K 15/0478
72/64

FOREIGN PATENT DOCUMENTS

| CN | 105900315 A | 8/2016 |
| CN | 208445375 U | 1/2019 |

(Continued)

OTHER PUBLICATIONS

China National Intellectual Property Administration, International Search Report, Apr. 23, 2020,.
(Continued)

*Primary Examiner* — Jose A Gonzalez Quinones
(74) *Attorney, Agent, or Firm* — Haynes and Boone, LLP

(57) ABSTRACT

The utility model relates to the technical field of motor structures, and particularly relates to a stator winding, a stator and a motor. The stator winding is formed by winding a flat wire, a part of the flat wire is wound to form at least two coils arranged at intervals, and the coils are consistent in winding direction and located on the same side of the flat wire. By using the solution, the technical effects of integrally forming the stator winding and sharing a flat wire by the coils located on the stator winding are achieved. Compared with the technical solution in the prior art that single coils are connected to form a stator winding, the technical solution in the utility model of integral forming has the following advantages: firstly, the connection difficulty in the prior art is avoided, and the production efficiency of the stator winding is greatly improved; secondly, unnecessary connecting points on the stator winding are avoided, and the (Continued)

quality of the stator winding is improved; and thirdly, the production process of the stator winding is reduced, and the production cost and the labor intensity are lowered.

24 Claims, 6 Drawing Sheets

(51) Int. Cl.
*H02K 3/12* (2006.01)
*H02K 15/04* (2006.01)

(58) Field of Classification Search
USPC .................................. 310/184, 203, 206–207
See application file for complete search history.

(56) References Cited

FOREIGN PATENT DOCUMENTS

| CN | 208445376 U | * | 1/2019 |
|----|----|----|----|
| CN | 209329821 U | | 8/2019 |
| JP | 2005237086 A | | 9/2005 |
| JP | 2013118750 A | | 6/2013 |
| JP | 6223835 B2 | | 10/2017 |
| JP | 2018166353 A | | 10/2018 |

OTHER PUBLICATIONS

Extended Search Report issued for European Patent Appllication No. 20749211, dated Sep. 9, 2022, 7 pages.

* cited by examiner

STATOR WINDING, STATOR AND MOTOR

CROSS REFERENCE TO RELATED APPLICATION(S)

The present application is a U.S. national stage patent application of International Patent Application No. PCT/CN2020/073949, filed on Jan. 23, 2020, which claims priority to Chinese Patent Application No. 201920180831.X filed Feb. 1, 2019, the benefit of each of which is claimed and the disclosures of which are incorporated herein by reference in their entirety.

TECHNICAL FIELD

The utility model relates to the technical field of motor structures, and particularly relates to a stator winding, a stator and a motor.

BACKGROUND

With the deterioration of environmental pollution and the booming of new energy industries, electric vehicles have gradually replaced traditional fuel vehicles due to their advantages of low emission, high efficiency and low cost, and have been widely promoted in the field of passenger vehicles and commercial vehicles. A drive motor as a core component of the electric vehicle is often required to have relatively high torque/power density, relatively wide speed range, relatively high overload capability and the like, which puts forward more and higher requirements for the electromagnetic design of drive motors for vehicles.

An existing drive motor mostly employs a discrete wire as a stator winding. The stator winding is described as an example, the stator winding adopts a random round wire inserted winding with a low filling ratio and high consumption, which often reduces the power density and high efficiency area of the motor. With the development of winding technology, more and more motor manufacturers begin to use flat wire windings. Compared with round wires, the utilization ratio of flat wires is high, and the flat wire windings can obtain a higher motor power density.

However, the flat wire motor stators on the present market are mostly formed by a single flat wire, then, a formed single flat wire coil is inserted into a stator slot, and finally, the flat wire windings are interconnected by welding to form a complete stator winding.

The method for forming a stator winding by welding a plurality of coils in the prior art has at least the following disadvantages:

(1) the welding cost and the production and processing costs are increased;
(2) the small activity space for operators during welding increases labor intensity and greatly reduces production efficiency;
(3) joint welding is difficult, takes a long time, has high labor intensity, and easily causes poor reliability of connection among coils, the connection process is complicated, false welding is easily caused, and the welding quality cannot be guaranteed;
(4) welding garbage within a stand is not easy to clean after welding is completed, and
(5) during welding, fireproof asbestos has to be firstly laid in a stator (which is cumbersome and not good for operator's health).

SUMMARY

Problems solved by the utility model are to improve the production efficiency of manufacturing a stator winding, reduce the production cost of the stator winding, and ensure the quality of the stator winding.

In order to solve the above problems, the utility model provides a stator winding. The stator winding is formed by winding a flat wire, a part of the flat wire is wound to form at least two coils arranged at intervals, and the coils are consistent in winding direction and located on the same side of the flat wire.

Optionally, the coils on the stator winding are distributed at equal intervals, and the coils distributed at intervals are identical coils.

Optionally, the other part of the flat wire is used to connect the adjacent coils, the flat wire that connects the adjacent coils is of a single-layer structure, and the single-layer flat wire is located on the same straight line in a first state.

Optionally, the other part of the flat wire is used to connect the adjacent coils, the flat wire that connects the adjacent coils is of a single-layer structure, and the single-layer flat wire is located on the same circumferential surface in a second state.

Optionally, the number of the coils arranged at intervals on the stator winding is 5.

Optionally, the number of layers of each coil is 14.

Optionally, the flat wire is a flat copper wire, and a section of the flat copper wire has a thickness of 1 mm and a width of 6 mm.

The utility model further provides a stator, including a stator core, wherein the stator core is of a ring structure, the stator core is uniformly provided with bosses in a circumferential direction, and snap slots are formed between the adjacent bosses: the snap slots are used to accommodate stator windings, and the stator windings are the stator winding of any of the above.

Optionally, the number of the stator windings located on the stator core is three, a coil at one end of each of the stator windings has an outgoing end, and the stator windings are connected by the outgoing ends.

The utility model further provides a motor, including the stator of any of the above.

Based on the above, compared with the prior art, the embodiments of the utility model have the following advantages.

According to a solution of the utility model, a stator winding with a plurality of coils is formed by winding a flat wire, which achieves a technical solution of integral formation of the stator winding. The technical solution provided by the utility model includes at least the following technical effects:

(1) the process of forming a stator winding by connecting different coils in the prior art is avoided, so that the production cost of the stator winding is reduced,
(2) the process of forming a stator winding by connecting different coils in the prior art is avoided, so that the connection difficulty is avoided, and the production efficiency of the stator winding is improved;
(3) the process of forming a stator winding by connecting different coils in the prior art is avoided, so that the operation of manually connecting the coils is reduced, and the labor intensity is lowered; and
(4) the stator winding is integrally formed, and the coils on the stator winding share a flat wire, so there are no connection points among the coils, which greatly improves the quality of the stator winding (avoids poor quality of the stator winding due to poor quality at the connection points).

Herein, it should be noted that "connection" may be welding or cold pressing connection. Specifically, the cold pressing connection may further include cold pressing of relative connection and cold pressing of parallel connection, which is not specifically limited herein. In order to make the above content of the utility model more obvious and understandable, preferred embodiments will be described in detail below in conjunction with accompanying drawings

Figure 1:
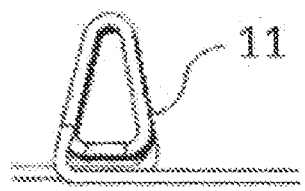
FIG. 1 is a schematic diagram of a single coil provided in an embodiment of the utility model.

The above accompanying drawings include the following reference numerals:
1, stator winding; 10, flat wire; 11, coil; 12, winding start end; 13, winding endpoint; 14, first coil; 15, second coil; 16, third coil; 17, fourth coil; 18, fifth coil;
2, stator; 20, stator core; 21, boss; 22, snap slot; 23, A-phase winding; 24, B-phase winding; and 25, C-phase winding.

DETAILED DESCRIPTION

The implementation modes of the utility model will be described below by specific embodiments, and those skilled in the art can easily understand other advantages and effects of the utility model from the content disclosed in this description. Although the description of the utility model will be introduced in conjunction with preferred embodiments, the features of the utility model are not limited to these implementation modes. In contrast, the introduction of the utility model in conjunction with the implementation modes is intended to cover other options or modifications that may extend on the basis of the claims of the utility model. In order to provide deep understanding of the utility model, many specific details will be included in the following description. The utility model may also be implemented without using these details. In addition, in order to avoid confusing or fuzzing the focus of the utility model, some specific details will be omitted in the description. It should be noted that the embodiments in the utility model and the features in the embodiments may be combined with each other on a non-conflict basis.

To make the objectives, technical solutions and advantages of the utility model clearer, the implementation modes of the utility model will be further described below in detail with reference to the accompanying drawings.

Referring to FIGS. 1 to 5, a first implementation mode of the utility model provides a stator winding 1. The stator winding 1 is formed by winding a flat wire 10, a part of the flat wire 10 is wound to form at least two coils 11 arranged at intervals, the coils 11 are consistent in winding direction, and the coils 11 are located on the same side of the flat wire 10.

Figure 2:
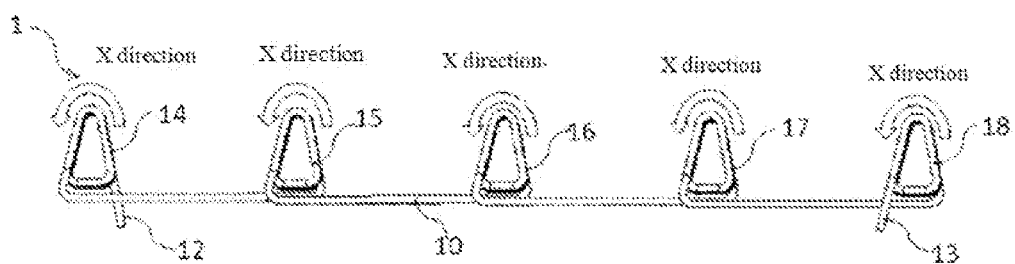
FIG. 2 is a schematic diagram of a stator winding provided in an embodiment of the utility model in a straight line distribution state.

The coils 11 can be respectively a first coil 14, a second coil 15, a third coil 16, a fourth coil 17 and a fifth coil 18, and the first coil 14, the second coil 15, the third coil 16, the fourth coil 17 and the fifth coil 18 share a flat wire and are located on the same side of the flat wire. In FIG. 2, all the coils on the stator winding are located on the upper side of the flat wire.

The stator winding provided by the utility model is used in a stator. The stator is a stationary portion of a motor, and its main function is to generate a rotating magnetic field. The stator consists of a stator core and a stator winding wound on the stator core. The stator core is of a ring structure, the stator core is uniformly provided with bosses in a circumferential direction, stator slots are formed between the adjacent bosses, the stator slots are used to accommodate stator windings, and the stator winding consists of a plurality of coils.

Referring to FIGS. 1 and 2, a stator winding 1 provided by the utility model is formed by winding a flat wire 10, and a part of the flat wire 10 is wound to form at least two coils 11 arranged at intervals. In other words, the stator winding is different from a traditional stator winding which is formed by connecting a plurality of separate coils, that is, flat wires are firstly wound to form a plurality of separate coils, and then, the plurality of separate coils are connected as required, for example, by welding, to form a stator winding including a plurality of coils. The different coils 11 on the stator winding 1 provided by the utility model share a flat wire 10. Sharing the flat wire 10 indicates that the stator winding 1 is of an integrally formed structure, that is, the stator winding 1 is formed by the same flat wire 10, so there are no connection points between the coils of the stator winding 1. In an embodiment, the connection points are welding points. In other embodiments, the connection points are not limited.

The stator winding provided by the utility model is integrally formed, and the coils on the stator winding share a flat wire, which achieves continuous formation of the stator winding. Compared to the technical solution in the prior art that different coils are connected to form a stator winding, the stator winding formed by the technical means of integral formation in the utility model does not have the quality problem caused by poor connection between the coils, so that the quality of the stator winding is guaranteed, and the consistency of quality of the stator winding is improved, meanwhile, the production process of the stator winding is also reduced, the production efficiency of the stator winding is improved, and the labor intensity is lowered.

The plurality of coils 11 formed by winding the flat wire 10 are consistent in winding direction. The flat wire is functionally divided into two parts, one part is wound into coils, and the other part is used to connect the adjacent coils.

With regard to the flat wire 10, the winding direction includes a winding direction of the flat wire 10 that forms the coils 11, and an extension direction of the flat wire 10 that connects the adjacent coils 11. The winding direction of the coils 11 refers to an entire winding process of winding the flat wire based on a preset shape to form coils consistent with a preset shape profile. The winding direction includes parameters such as a winding angle, a radian and a winding length in the process of winding the flat wire 10 to form the coils 11, and the winding direction of the coils 11 determines the sizes and shapes of the coils 11 formed by winding the part of the flat wire.

The plurality of coils formed by winding the flat wire are consistent in winding direction. In an embodiment, the plurality of coils on the stator winding are identical in size and shape.

Referring to FIGS. 1 to 5, in an embodiment provided by the utility model, one end of the flat wire 10 is defined as a winding start end 12, and the other end is defined as a winding endpoint 13. The flat wire 10 is sequentially wound from the winding start end 12 to form a plurality of coils 11 arranged at intervals, and it can be defined that the coil wound at the first time is a first coil 14, the coil wound at the second time is a second coil 15, the coil wound at the third time is a third coil 16, the coil wound at the fourth time is a fourth coil 17, the coil wound at the fifth time is a fifth coil 18, and the coil wound at the N time is an $N^{th}$ coil. The first coil 14, the second coil 15, the third coil 16, the fourth coil 17, the fifth coil 18 and the $N^{th}$ coil are identical in size and shape, and the first, second . . . $N^{th}$ described herein can represent a time sequence, wherein N is a positive integer greater than or equal to 1.

In other embodiments, the flat wire 10 can also be sequentially wound from the winding endpoint 13 to form a plurality of coils 11 distributed at intervals till the winding start end 12 of the flat wire 10. That is, the winding endpoint 13 and the winding start end 12 in the utility model are relative concepts, and can be exchanged in different implementation modes, which is not limited herein.

Figure 4:
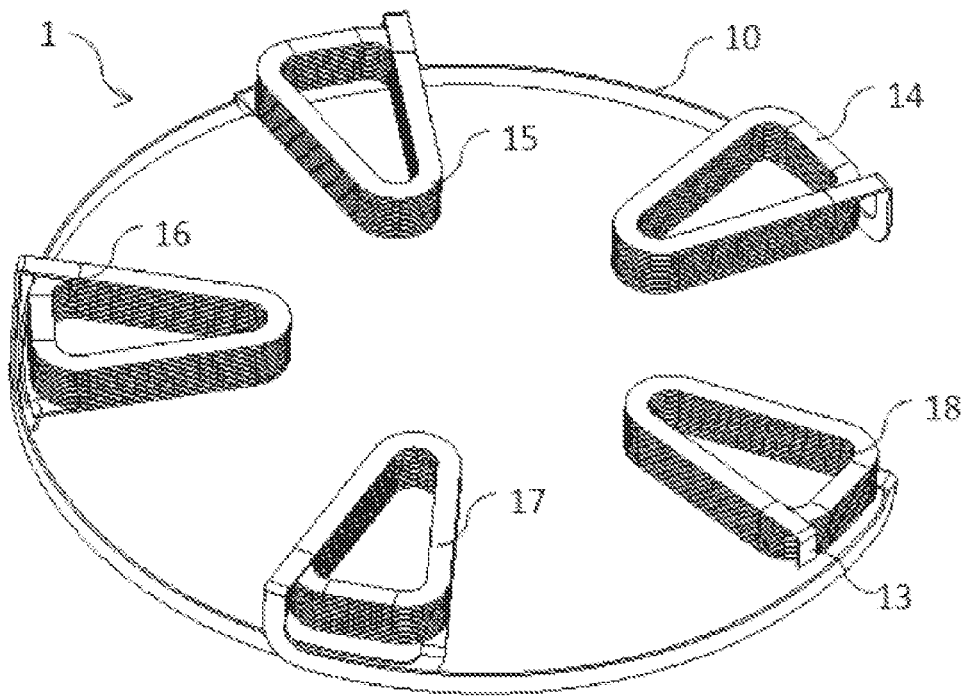
FIG. 4 is a top three-dimensional diagram of a stator winding provided in an embodiment of the utility model in a circumferential distribution state.
Figure 5:
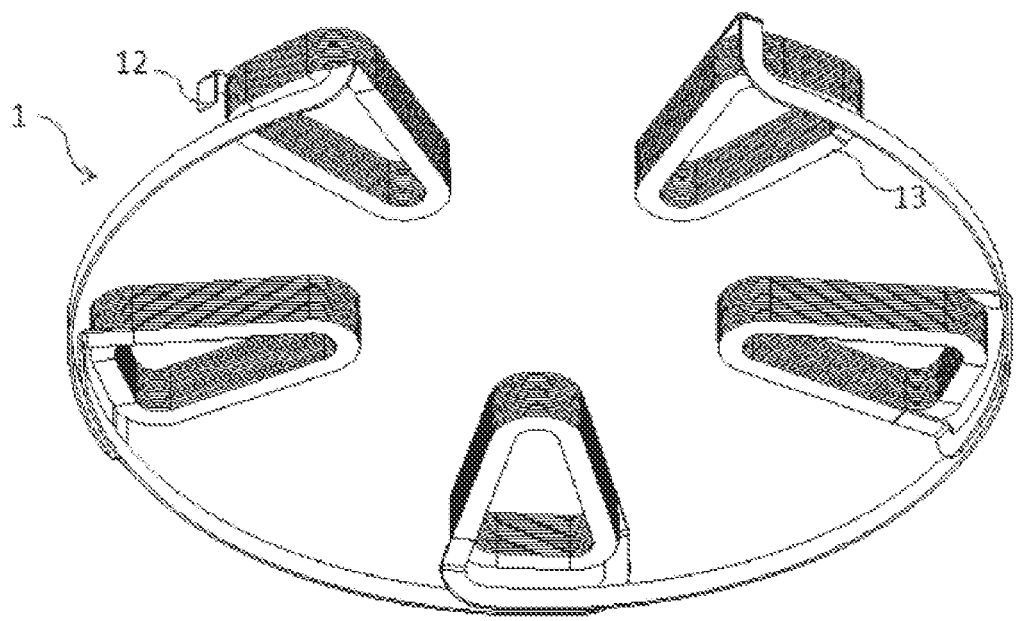
FIG. 5 is a bottom-view three-dimensional diagram of a stator winding provided in an embodiment of the utility model in a circumferential distribution state.
Figure 6:
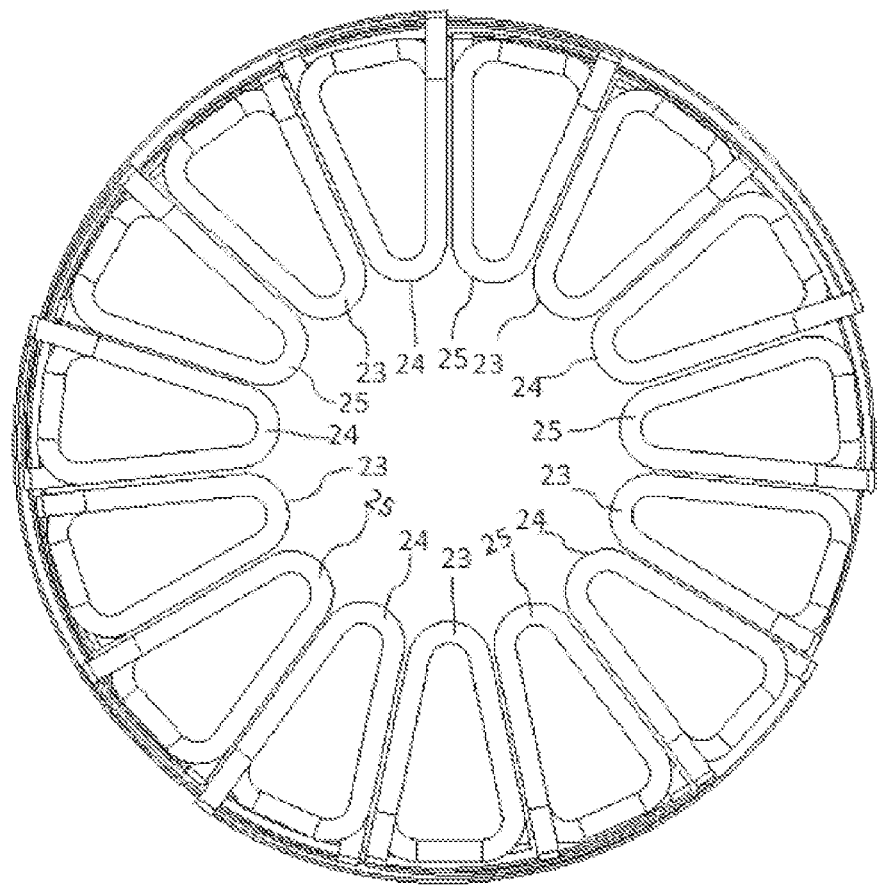
FIG. 6 is atop plan diagram of a three-phase stator winding provided in an embodiment of the utility model in a circumferential distribution state.
Figure 7:
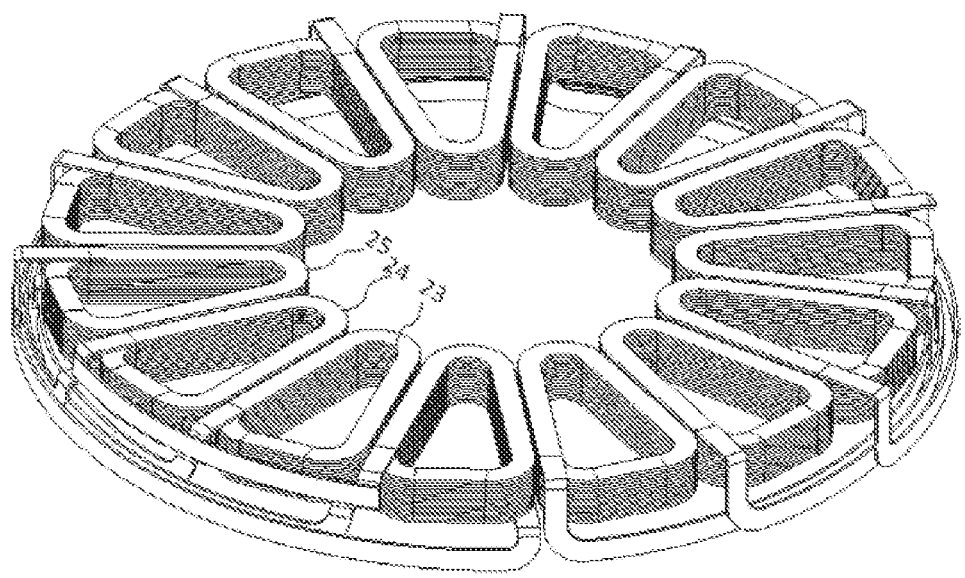
FIG. 7 is a first top three-dimensional diagram of a three-phase stator winding provided in an embodiment of the utility model in a circumferential distribution state.

For each coil on the stator winding, the number of layers of each coil wound is not limited. The number of layers of each coil is defined as n, wherein n is a positive integer greater than or equal to 1. When n=1, the coil is a single-layer coil. When n is greater than 1, the coil is a multi-layer coil. Referring to FIG. 4 and FIG. 5, in an embodiment provided by the utility model, n=14, and in the extension direction from the winding start end 12 to the winding endpoint 13, the flat wire 10 is wound to form five coils 11 distributed at intervals; and the winding direction of each coil 11 is counterclockwise (refer to the X direction in FIG. 2). In other embodiments, in the extension direction from the winding start end 12 to the winding endpoint 13 of the flat wire 10, the flat wire 10 is wound to form five coils 11, and the winding direction of each coil 11 is clockwise.

It should be noted that, in other embodiments, n=30 layers, those skilled in the art can select a suitable value of n according to specific applications, and the multi-layer coils function to enhance a magnetic field. In addition, the number of the coils is at least two, preferably, all the coils located on the same flat wire are identical in structure and shape, the coils on the stator winding are arranged at intervals, and the plurality of coils share the flat wire.

Referring to FIG. 1 and FIG. 2, in an embodiment, from the winding start end 12 of the flat wire 10, the part of the flat wire 10 to be wound into coils 11 is wound counterclockwise (X direction in FIG. 2) to form a plurality of coils 11, and the plurality of coils 11 distributed at intervals are formed by winding the flat wire 10 counterclockwise, at the moment, the winding start end 12 and the winding endpoint 13 of the flat wire 10 are respectively located on the sides, close to the adjacent coils, of the first coil 14 and the fifth coil 18, that is, the sides close to the second coil 15 and the fourth coil 17. In another embodiment, from the winding start end 12 of the flat wire, the part of the flat wire to be wound into coils is wound clockwise to form a plurality of coils, and the plurality of coils distributed at intervals are formed by winding the flat wire clockwise, at the moment, the winding start end and the winding endpoint of the flat wire are respectively located on the sides, away from the adjacent coils, of the first coil and the $N^{th}$ coil.

Continuing to refer to FIG. 2, in the extension direction from the winding start end 12 to the winding endpoint 13, the flat wire 10 is wound to form five coils arranged at intervals, and the winding direction of each coil is counterclockwise (X direction in FIG. 2). In other embodiments, in the extension direction from the winding start end to the winding endpoint of the flat wire, the flat wire is wound to form five coils arranged at intervals, and the winding direction of each coil is clockwise.

A part of the flat wire 10 is wound to form a first coil 14, a second coil 15, a third coil 16, a fourth coil 17 and a fifth coil 18 distributed at intervals, and the other part of the flat wire 10 is used to connect the adjacent coils. Referring to FIG. 2, in an embodiment, the flat wire 10 that connects the adjacent coils is of a single-layer structure, and the single-layer flat wire 10 is located on the same straight line in a first state. More specifically, the stator winding 1 extends straight, and in an embodiment, the flat wire 10 that connects the adjacent coils is located on the same straight line. Herein, the same straight line indicates that the flat wire 10 that connects the coils is in an almost complete extension state, that is, the flat wire 10 that connects the adjacent coils is located on the same straight line.

In another embodiment, the single-layer flat wire that connects the adjacent coils is not located on the same straight line, however, at the moment, after the flat wire that is not located on the same straight line is completely extended, the single-layer flat wire that connects the coils can be located on the same straight line, and the flat wire that connects the adjacent coils is equal in length.

Figure 3:
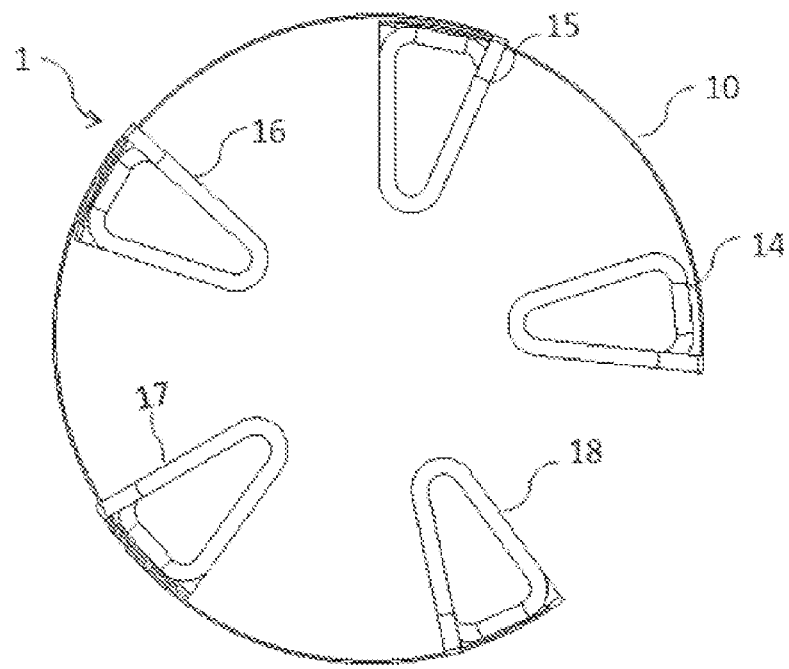
FIG. 3 is a top plan diagram of a stator winding provided in an embodiment of the utility model in a circumferential distribution state.

Referring to FIGS. 3 to 5, a part of the flat wire 10 is wound to form a plurality of coils which are respectively a first coil 14, a second coil 15, a third coil 16, a fourth coil 17 and a fifth coil 18 distributed at intervals. The other part of the flat wire 10 is used to connect the adjacent coils, the flat wire 10 that connects the adjacent coils is of a single-layer structure, and the single-layer flat wire 10 is located on the same circumferential surface in a second state. More specifically, the stator winding 1 is of a circumferential structure, that is, the flat wire 10 that connects the adjacent coils is located on the same circumferential surface, and the coils 11 on the stator winding are also located on the same circumferential surface.

During specific implementation, a straight stator winding can be secondarily wound to form a circumferential stator winding, and conversely, the circumferential stator winding can also be extended to form the straight stator winding, which is not limited herein. That is, the stator winding in the second state can be converted to the stator winding in the first state.

The coils on the stator winding are distributed at equal intervals, and the coils distributed at intervals are identical coils. Herein, the identical coils indicate coils with identical size, shape, and number of layers of each coil wound.

The stator winding is formed by winding a flat wire, and the length of the flat wire should satisfy at least the following two conditions: 1, a part of the flat wire can be wound to form at least two coils arranged at intervals; and 2, the other part of the flat wire is used to connect the adjacent coils.

For condition 1: a part of the flat wire can be wound to form at least two coils. Herein, the number of layers of the coils is not limited, the coils are single-layer coils in one embodiment, and the coils are multi-layer coils in another embodiment. The number of the coils is at least two, preferably, the two coils having a multi-layer structure are identical in structure and shape, the coils on the stator winding are arranged at intervals, and the plurality of coils share the flat wire.

For condition 2: the other part of the flat wire is used to connect the adjacent coils. In an embodiment, when the number of coils on the stator winding is 2, the other part of the flat wire is used to connect the adjacent coils, and the flat wire that is used to connect the adjacent coils is of a single-layer structure. In another embodiment, when the number of coils on the stator winding is greater than 2, the different coils are arranged at equal intervals, that is, the flat wire that is used to connect the different coils is identical in length.

Referring to FIGS. 1 to 5, the number of coils 11 arranged at intervals on the stator winding is 5. In other embodiments, the number of coils 11 arranged at intervals on the stator winding is not limited, and as long as the stator winding has the structural characteristics of the above-described stator winding, it falls into the protection scope of the utility model.

It should be noted that, in one embodiment provided by the utility model, the flat wire is a wire formed by arranging an insulating coating film on the outer surface of a metal wire, such as copper, having good conductivity, and its section is rectangular. More specifically, the section of the flat wire is 1 mm×6 mm, that is, the section of the flat wire has a thickness of 1 mm and a width of 6 mm, and the flat wire is sequentially wound and stacked according to a certain shape to form five coils having 14 layers. In other embodiments, the structure, shape and parameters of the flat wire are not limited as long as the flat wire with such characteristics can form a stator winding.

Referring to FIGS. 6 to 10, a second implementation mode of the utility model further provides a stator 2. The stator 2 includes a stator core 20, the stator core 20 is of a ring structure, the stator core 20 is uniformly provided with bosses 21 in a circumferential direction, and snap slots 23 are formed between the adjacent the boss 21. The snap slots 23 are used to accommodate stator windings, and the stator windings include the stator winding described in any embodiment of the first implementation mode described above.

It should be noted that coils are basic units constituting the stator winding, and the stator winding is formed by arranging and connecting the coils according to a certain rule. The number of stator windings on the stator core is the number of phases of the stator, that is, if there are M groups of stator windings on the stator core, this stator is an M-phase stator, wherein M may be any one of 2, 3, 4, and 5. The number of stator windings in the stator is not limited in the utility model, and the specific number of stator windings can be selected according to actual requirements.

In an embodiment, the number of stator windings on the stator core is two, that is, M=2, the stator windings are two-phase windings. The two-phase windings are identical stator windings. The coils formed by winding the flat wires on the two windings are consistent in winding direction. In other words, in the extension direction from the winding start end to the winding endpoint of the flat wire, the winding direction of the coils formed by winding the flat wire in a first-phase winding is counterclockwise, and correspondingly, the winding direction of the coils formed by winding the flat wire in a second-phase winding is also counterclockwise. In another embodiment, in the extension direction from the winding start end to the winding endpoint of the flat wire, the winding direction of the coils formed by winding the flat wire in the first-phase winding is clockwise, and correspondingly, the winding direction of the coils formed by winding the flat wire in the second-phase winding is also clockwise.

Further, in the case of two-phase windings, the coils on the stator windings are sequentially arranged in the snap slots 23 of the stator core 20, at the moment, the coils of each phase winding occupy half of the snap slots 23 of the stator core 20. In addition, the coils of the two-phase windings can also be crossed. The arrangement of the stator windings is not limited herein as long as the stator on which the stator windings are arranged can achieve specific functions.

Figure 8:
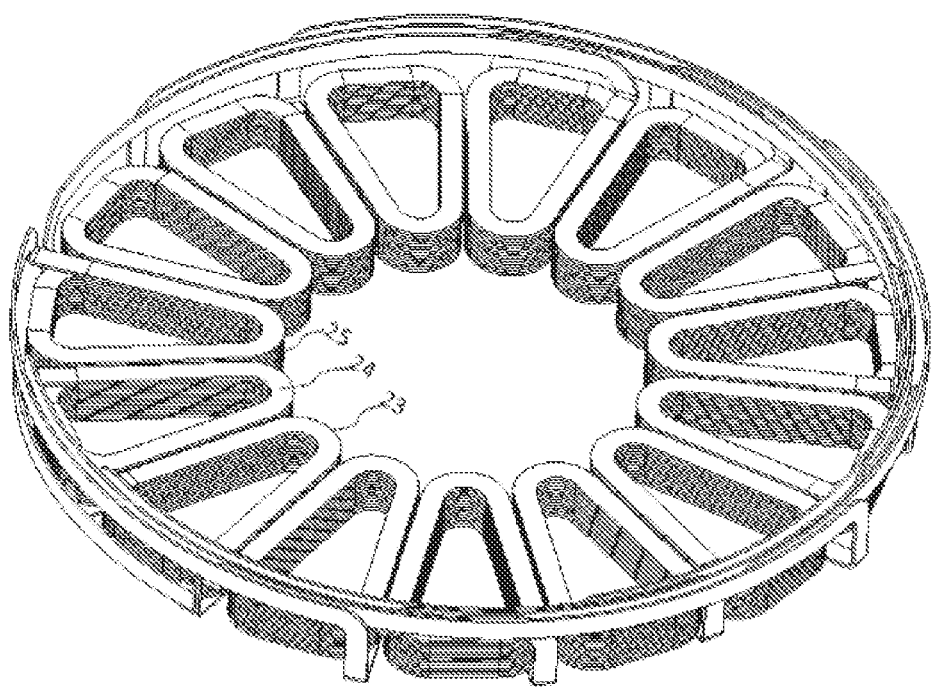
FIG. 8 is a second top plane diagram of a three-phase stator winding provided in an embodiment of the utility model in a circumferential distribution state.
Figure 9:
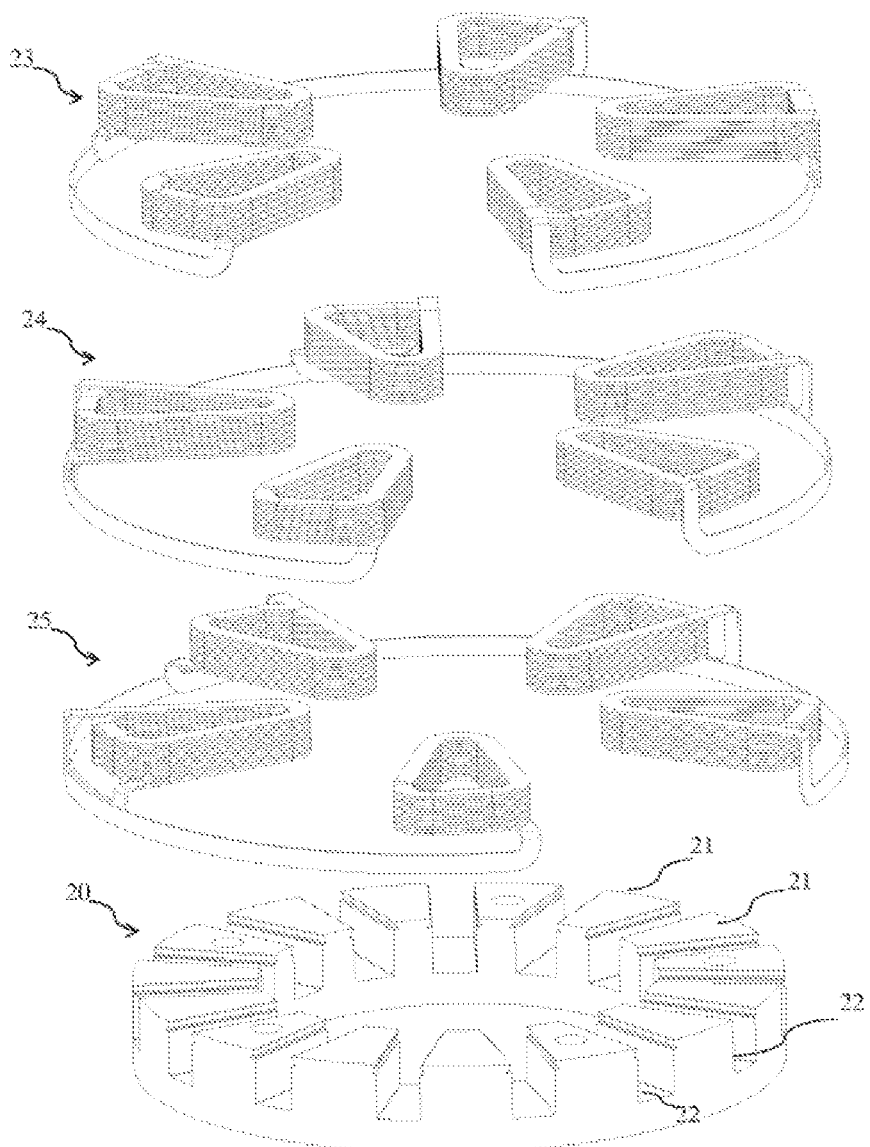
FIG. 9 is an exploded three-dimensional diagram of a three-phase stator provided in an embodiment of the utility model.
Figure 10:
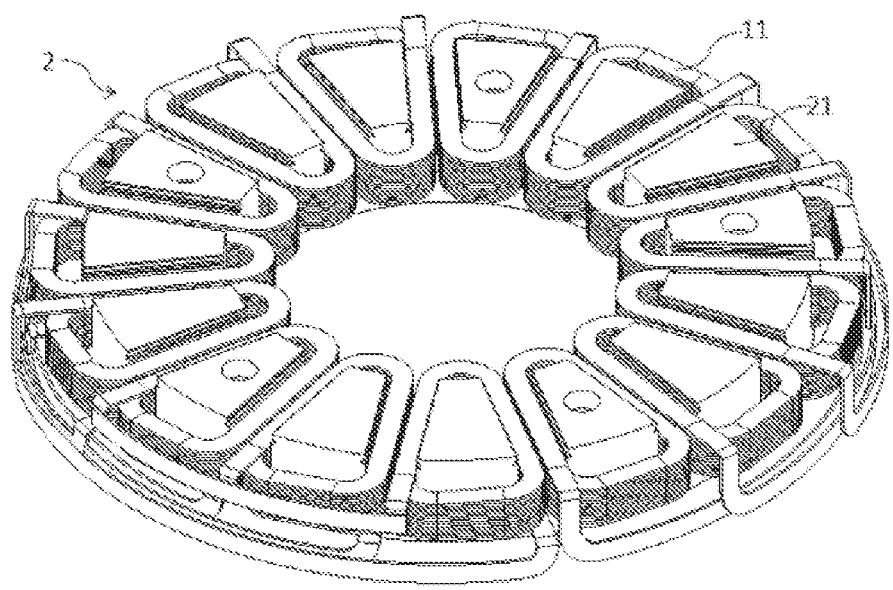
FIG. 10 is a top three-dimensional diagram of a three-phase stator provided in an embodiment of the utility model.

Referring to FIGS. 8 to 9, the number of stator windings on the stator core 20 is three, that is, M=3, the stator windings are three-phase windings. The number of coils 11 on the stator core 20 should be a multiple of 3, and specifically, may be any one of 3 to 60 that can be exactly divided by 3. There are 15 coils 11 in this embodiment. The windings in this embodiment include an A-phase winding 23, a B-phase winding 24 and a C-phase winding 25, each phase winding has five coils 11, and each winding is integrally formed, that is, the coils in each phase winding share a flat wire 10. More specifically, in each phase winding, there are no connection points on a single coil and between the coils. In an embodiment, the connection points are welding points. In other embodiments, the connection points may be riveting points, threaded connection points, and the like. Specifically, the A-phase winding 23 is formed by sequentially arranging the coils 11 of the A-phase winding 23, the B-phase winding 24 is formed by sequentially arranging the coils 11 of the B-phase winding 24, and the C-phase winding 25 is formed by sequentially arranging the coils 11 of the C-phase winding 25.

In the case of three-phase windings, the coils of the stator windings can be connected in a star shape (Y connection), or connected in a triangle (A connection), or connected in other forms as long as the stator windings can be reliably connected to form reliable and effective three-phase stator windings.

Referring to FIG. 5, the coil at one end of the stator winding has an outgoing end, and the stator windings are connected by the outgoing ends. The outgoing end can be the winding endpoint or the winding start end on the stator winding.

In actual production, a method for installing coils into a motor stator includes the following steps.

In the prior art, a method for installing coils into a motor stator includes the following steps:
  winding: a flat wire is wound according to a certain rule to form single coils;
  inserting: the single coils formed are placed in a stator core according to a certain sequence;
  connection: all the single coils on the stator core are connected; and
  test: whether the connected coils are conducted is tested.

A method for installing coils into a motor stator through a stator provided by the utility model includes the following steps:

winding: a flat wire is wound according to a certain rule to form a stator winding at least having two coils distributed at intervals;

inserting: each stator winding is placed in a stator core according to a certain sequence;

connection: the windings on the stator core are connected according to a certain rule; and test: whether the connected coils are conducted is tested.

By comparing the method for installing coils into a motor stator in the prior art with the method for installing coils into a motor stator in the utility model, it can be known that the stator winding provided by the utility model realizes a process of winding a flat wire to form a stator winding, which completely gets rid of the technical means of connecting different single coils to form a stator winding in the prior art, greatly improves an existing process, and greatly improves the production efficiency of the stator winding. The stator winding provided by the utility model can also be used in the field of electromagnetic technology, such as inductors and transformers.

The motor provided by the utility model can also be used in a vehicle. Other structures and operations of the motor and the vehicle according to the embodiments of the utility model can be understood and easily implemented by those skilled in the art. Therefore, details are not repeated herein.

Through the above technical solutions, the utility model achieves a technical solution of forming continuous windings of a stator by using a flat wire, and at least two coils spaced are sequentially arranged on the stator winding. All coils on the stator winding provided by the utility model share a flat wire, which is different from a traditional technical solution that coils need to be welded or connected in other ways. This technical solution at least has the following technical effects:

(1) the stator winding is integrally formed, and all the coils on the stator winding share a flat wire, which reduces the production cost of the stator winding and improves the production efficiency of the stator winding;

(2) an unnecessary process (for connecting different coils) during the production of the stator winding is reduced, thereby improving the production efficiency of the stator winding and lowering the labor intensity; and (3) the stator winding is integrally formed, all the coils share a flat wire, and there are no connection points between the coils, so that the consistency of the quality of the stator winding product is improved.

In summary, the above embodiments provided by the utility model merely exemplify the principles and effects of the utility model, rather than limiting the utility model. Any person who is familiar with this art can modify or change the above embodiments without violating the spirit and scope of the utility model. Therefore, all equivalent modifications or changes made by those having general knowledge in the technical field without departing from the spirit and technical thought disclosed in the utility model shall still be covered by the claims of the utility model.

What is claimed is:

1. A stator winding assembly comprising a flat wire having a first face, a second face parallel with the first face and opposing edges, wherein the first and second faces have a width W and the opposing edges have a thickness T, the flat wire forming a first coil portion and a first connector portion, wherein the first coil portion forms at least one turn about a first coil axis and includes at least a first linear portion formed by the flat wire and a second linear portion formed by the flat wire so that the faces of each linear portion are perpendicular to the first coil axis, with a radial coil bend about the first coil axis at a junction formed by the intersection of between the first and second linear portions, the radial coil bend having a first radius $R1$, wherein the first connector portion joins with the first linear portion at a first linear bend across the first face of the flat wire between the opposing edges so that the first linear bend is perpendicular to the first coil axis, the first connector portion further including an elongated curved portion about the coil axis at a second radius $R2$ greater than the first radius $R1$, with a first elbow formed along the first connector portion between the elongated portion and the first linear bend so that the first connector portion extends towards the second linear portion of the coil portion.

2. The stator winding assembly of claim 1, wherein the first coil portion is comprised of a plurality of adjacent turns of the flat wire, each turn having at least a first linear portion formed by the flat wire and a spaced apart second linear portion formed by the flat wire with a radial coil bend about the coil axis at a junction formed by the intersection of the first and second linear portions of a turn, each radial coil bend having a first radius $R1$, wherein the first face of a one turn abuts the second face of an adjacent turn to form a coil stack with an uppermost turn and a lowermost turn.

3. The stator winding assembly of claim 2, further comprising a second coil portion forming at least one turn about a second coil axis and includes at least a first linear portion formed by the flat wire and a second linear portion formed by the flat wire so that the faces of each linear portion are perpendicular to the second coil axis, with a radial coil bend about the second coil axis at a junction formed by the intersection of the first and second linear portions of the second coil portion, wherein the first connector portion extends from a first end adjacent the first elbow to a second end having a second elbow, the first connector portion joining with the second linear portion of the second coil portion at a second linear bend across the first face between the opposing edges so as to be perpendicular to the second coil axis.

4. The stator winding assembly of claim 1, wherein the at least one turn about the first coil axis and the elongated curved portion about the first coil axis extend in the same clockwise or counterclockwise direction.

5. The stator winding assembly of claim 1, wherein the first coil portion and the first connector portion are integrally formed of a single flat wire.

6. The stator winding assembly of claim 1, comprising a plurality of first coil portions and a plurality of first connector portions, wherein the plurality of first coil portions and the plurality of first connector portions are integrally formed of a single flat wire.

7. The stator winding assembly of claim 1, further comprising a second coil portion formed around a second coil axis parallel with the first coil axis, wherein the flat wire is continuous and forms each of the first coil portion and the second coil portion which first and second coil portions are interconnected by the f connector portion.

8. The stator winding assembly of claim 7, wherein each coil portion is comprised of a plurality of adjacent turns of the flat wire, each turn having at least a first linear portion formed by the flat wire and joined with a second linear portion formed by the flat wire with a radial coil bend about the coil axis between the first and second linear portions, the radial coil bend having a first radius $R1$, wherein the first face of a one turn abuts the second face of an adjacent turn to form a coil stack with an uppermost turn and a lowermost turn.

9. The stator winding assembly of claim 8, wherein the first connector portion extends from a first end adjacent the first elbow to a second end having a second elbow, the first connector portion joining with the second coil portion at a second linear bend across the first face of the flat wire between the opposing edges so as to be perpendicular to the second coil axis, the first linear bend formed with the uppermost turn of the first coil portion and the second linear bend formed with the lowermost turn of the second coil portion.

10. The stator winding assembly of claim 9, wherein the first elbow has a radius that is larger than a radius of the second elbow.

11. The stator winding of claim 10, wherein the first elbow is spaced apart from the first linear bend of the f connector portion and the second elbow is adjacent the second linear bend of the first connector portion.

12. The stator winding of claim 11, wherein each of the first and second coil portions form a coil stand, and wherein the first linear bend in the first connector portion is in the direction of the coil stack of the first coil portion and the second linear bend in the connector portion is away from the coil stack of the second coil portion.

13. The stator winding assembly of claim 7, wherein each coil portion is formed about a coil axis and is comprised of a plurality of adjacent turns of the flat wire, each turn having at least a first linear portion formed by the flat wire and a second linear portion formed by the flat wire with a radial coil bend about the coil axis at a junction formed by the intersection of the first and second linear portions, the radial coil bend having a first radius R1, wherein the first face of a one turn abuts the second face of an adjacent turn to form a coil stack with an uppermost turn and a lowermost turn; wherein the connector portion extends from a first end adjacent the first elbow to a second end adjacent a second elbow, a second linear bend across the first face between the opposing edges formed in the flat wire adjacent the second end of the connector portion so as to be perpendicular to the coil axis, the first linear bend formed with the lower most turn of the first coil portion and the second linear bend formed with the upper most turn of the second coil portion, wherein the first elbow has a radius that is larger than a radius of the second elbow.

14. The stator winding assembly of claim 1, further comprising a stator core assembly formed of a ring-shaped stator core with a plurality of stator teeth spaced apart from one another circumferentially about the stator core so as to form slots between adjacent stator teeth, wherein at least two stator teeth each have a coil portion disposed thereon and a connector portion extends between the coil portions of the at least two stator teeth.

15. The stator winding of claim 1, wherein the thickness T of the flat wire is approximately 1 mm and a width W of the flat wire is approximately 6 mm.

16. The stator winding of claim 1, wherein the first connector portion is oriented so that the flat face of the wire forming the first connector portion is parallel with the first coil axis, the stator winding further comprising a second connector portion formed of the flat wire, the second connector portion further including an elongated curved portion about the coil axis, wherein the elongated curved portion of the second connector portion is oriented so that the flat face of the wire forming the elongated curved portion of the second connector portion is parallel with the first coil axis, the second connector portion having a first elbow formed alone the second connector portion, wherein the second connector portion loins with the second linear portion at a second linear bend across the first face of the flat wire between the opposing edges so that the second linear bend is perpendicular to the first coil axis, wherein the second connector portion extends from the second linear portion towards the first linear portion of the coil portion, and wherein the flat face of the curved portion of the first connector portion is adjacent to and substantially parallel with the flat face of the curved portion of the second connector portion.

17. A stator winding assembly comprising a flat wire having a flat face, a first edge and a second edge, the flat wire forming at least two coil portions interconnected by a connector portion all integrally formed by the flat wire, wherein each coil portion is formed about a coil axis and includes a plurality of adjacent turns of the flat wire about the coil axis, each turn having at least a first linear portion formed by the flat wire and a second linear portion formed by the flat wire with a first radial coil bend about the coil axis at a junction formed by the intersection of the first and second linear portions, wherein the flat face of each turn is oriented in the same direction along the coil axis to form a coil stack with an uppermost turn and a lowermost turn; wherein the connector portion extends from a first end adjacent the uppermost turn of one coil portion to a second end adjacent the lowermost turn of the other coil portion; a first linear bend formed across the flat face of the flat wire adjacent the first end of the connector portion; a second linear bend formed across the flat face of the flat wire adjacent the second end of the connector portion; the connector portion further including an elongated curved portion about the coil axii with a first elbow formed along the connector portion adjacent the first linear bend; and a second elbow formed along the connector portion adjacent the second linear bend, wherein the connector portion is oriented so that the flat face of the wire forming the curved portion of the connector portion is parallel with the coil axii.

18. The stator winding assembly of claim 17, wherein for each coil portion, the at least one turn about the coil axis and the elongated curved portion about the coil axis extend in the same clockwise or counterclockwise direction.

19. The stator winding assembly of claim 18, further comprising a stator core assembly formed of a ring-shaped stator base with a plurality of stator teeth extending from the stator base and spaced apart from one another circumferentially about the stator base so as to form slots between adjacent stator teeth, wherein a coil portion is disposed around each stator tooth and a connector portion extends around a portion of the stator base interconnecting the coil portions of two stator teeth.

20. The stator winding assembly of claim 17, where each turn is triangular in shape, each turn having a third linear portion spaced apart from the first radial coil bend and interconnecting a first linear portion of one turn with a second linear portion of an adjacent turn.

21. A stator winding assembly comprising a first flat wire having a first flat face, a second flat face, a first edge and a second edge, the first flat wire forming a first plurality of coil portions interconnected by a first plurality of connector portions where the first plurality of coil portions and the first plurality of connector portions are of all integrally formed of a first continuous strand of flat wire, wherein each coil portion has a coil axis and is formed a plurality of adjacent turns of the first continuous strand of flat wire about the coil axis, each turn having at least a first linear portion formed by the first continuous strand of flat wire and a second linear portion formed by the first continuous strand of flat wire with a first radial coil bend about the coil axis at a junction formed by the intersection of between the first and second linear portions, wherein the first flat face of a turn abuts the second flat face of an adjacent turn so that the plurality of turns form a coil stack with an uppermost turn and a lowermost turn and the flat faces of all turns are perpendicular to the coil axii;

wherein each connector portion extends from a first end adjacent an outermost turn of one of the first plurality of coil portions to a second end adjacent an outmost turn of another of the first plurality of coil portions thereby interconnecting two coil portions of the first plurality of coil portions; a first linear bend formed across the flat face of the flat wire adjacent the first end of the connector portion and connecting the connector portion to a first linear portion of one coil portion; a second linear bend formed across the flat face of the flat wire adjacent the second end of the connector portion and connecting the connector portion to a second linear portion of another coil portion; the connector portion further including an elongated portion curved about the coil axii of two interconnected coil portions with a first elbow formed along the connector portion at one end and adjacent the first linear bend, and a second elbow formed along the connector portion at the other end and adjacent the second linear bend, wherein each of the first plurality of connector portions is oriented so that the flat face of the wire forming the curved portion of the connector portion is parallel with the coil axii and perpendicular to the flat face of the coil portions.

22. The stator winding assembly of claim 21, further comprising a second flat wire having a first flat face, a second flat face, a first edge and a second edge, the second flat wire forming a second plurality of coil portions interconnected by a second plurality of connector portions, where the second plurality of coil portions and the second plurality of connector portions are of all integrally formed of a second continuous strand of the second flat wire, wherein each coil portion of the second plurality of coil portions has a coil axis and is formed a plurality of adjacent turns of the second continuous strand of the second flat wire about the coil axis, each turn having at least a first linear portion formed by the second continuous strand of the second flat wire and a second linear portion formed by the second continuous strand of the second flat wire with a first radial coil bend about the coil axis at a junction formed by the intersection of the first and second linear portions, wherein the first flat face of a turn abuts the second flat face of an adjacent turn so that the plurality of turns of each second plurality of coil portions forms a coil stack with an uppermost turn and a lowermost turn; and wherein each of the second plurality of connector portions extends from a first end adjacent an uppermost turn of one of the second plurality of coil portions to a second end adjacent lowermost turn of another of the second plurality of coil portions thereby interconnecting two coil portions of the second plurality of coil portions; a first linear bend formed across the flat face of the second flat wire adjacent the first end of the connector portion; a second linear bend formed across the flat face of the second flat wire adjacent the second end of the connector portion; the connector portion further including an elongated portion curved about the coil axii of the two interconnected coil portions of the second plurality of coil portions with a first elbow formed along the connector portion between the elongated portion and the first linear bend; and a second elbow formed along the connector portion between the elongated portion and the second linear bend, wherein each of the second plurality of connector portions is oriented so that the flat face of the wire forming the connector portion is parallel with the coil axii and perpendicular to the flat face of the coil portions.

23. The stator winding assembly of claim 22 wherein the first plurality of coil portions is interleaved with the second plurality of coil portions.

24. The stator winding assembly of claim 23, wherein the flat face of a connector portion from the first plurality of connector portions is adjacent to and substantially parallel with the flat face of a connector portion from the second plurality of connector portions.

* * * * *

UNITED STATES PATENT AND TRADEMARK OFFICE
CERTIFICATE OF CORRECTION

PATENT NO. : 12,088,162 B2
APPLICATION NO. : 17/427580
DATED : September 10, 2024
INVENTOR(S) : Hongbo Liang and Li Guo Page 1 of 1

It is certified that error appears in the above-identified patent and that said Letters Patent is hereby corrected as shown below:

In the Claims

Column 10, Line 6, delete "between" after -- section of --

Column 10, Line 60, change "f" to -- first --

Column 11, Line 18, change "f" to -- first --

Column 12, Line 2, change "alone" to -- along --

Column 12, Line 3, change "loins" to -- joins --

Column 13, Line 4, delete "between" after -- intersection of --

Signed and Sealed this
Seventeenth Day of December, 2024

Derrick Brent
*Acting Director of the United States Patent and Trademark Office*